US012671673B2

(12) United States Patent
Zhan et al.

(10) Patent No.: US 12,671,673 B2
(45) Date of Patent: Jun. 30, 2026

(54) BATTERY MANAGEMENT SYSTEM, AND METHODS FOR ADDRESS ALLOCATION AND OFFLINE RECONNECTION

(71) Applicant: SICHUAN CAMY NEW ENERGY CO., LTD., Chengdu (CN)

(72) Inventors: Dingpeng Zhan, Chengdu (CN); Jie Zhuang, Chengdu (CN); Hui Gou, Chengdu (CN); Yiping Huang, Chengdu (CN)

(73) Assignee: SICHUAN CAMY NEW ENERGY CO., LTD., Chengdu (CN)

( * ) Notice: Subject to any disclaimer, the term of this patent is extended or adjusted under 35 U.S.C. 154(b) by 529 days.

(21) Appl. No.: 18/259,437

(22) PCT Filed: May 24, 2021

(86) PCT No.: PCT/CN2021/095377
§ 371 (c)(1),
(2) Date: Jun. 27, 2023

(87) PCT Pub. No.: WO2022/142087
PCT Pub. Date: Jul. 7, 2022

(65) Prior Publication Data
US 2024/0056419 A1    Feb. 15, 2024

(30) Foreign Application Priority Data

Dec. 28, 2020    (CN) .......................... 202011581398.4

(51) Int. Cl.
*H04L 61/5053*        (2022.01)
*H04L 12/40*          (2006.01)
(Continued)

(52) U.S. Cl.
CPC ...... *H04L 61/5053* (2022.05); *H04L 41/0661* (2023.05); *H04L 67/12* (2013.01); *H04L 12/40* (2013.01)

(58) Field of Classification Search
None
See application file for complete search history.

(56) References Cited

U.S. PATENT DOCUMENTS

2012/0183813 A1* 7/2012 Kim ..................... H01M 50/204
                                                        429/7
2013/0141106 A1* 6/2013 Yang .................. G01R 31/3835
                                                        324/426
(Continued)

FOREIGN PATENT DOCUMENTS

CN      107733956 A    2/2018
CN      109474711 A    3/2019
(Continued)

OTHER PUBLICATIONS

International Search Report; International Patent Application No. PCT/CN2021/128302; Jan. 26, 2022; China National Intellectual Property Administration (ISA/CN), Beijing, China.

*Primary Examiner* — Mohamed Ibrahim
(74) *Attorney, Agent, or Firm* — Central California IP Group, P.C.; Andrew D. Fortney

(57)        ABSTRACT

Disclosed are a battery management system and methods for address allocation and offline reconnection. A main battery management unit has an address setting enable signal, an address allocation message is sent in a broadcast manner, and the address allocation message comprises an address number and an identification code; when an address needs to be set for a sub-battery management unit, the enable signal is set to be low and valid. When detecting that the enable signal is valid, the sub-battery management unit sets and stores the received address, and if the enable signal is not (Continued)

detected, address pairing can also be completed by means of the identification code in the information.

20 Claims, 3 Drawing Sheets

(51) Int. Cl.
  *H04L 41/0659*      (2022.01)
  *H04L 67/12*        (2022.01)

(56)             References Cited

U.S. PATENT DOCUMENTS

| | | |
|---|---|---|
| 2013/0181513 A1 | 7/2013 | Yano |
| 2014/0115191 A1* | 4/2014 | Kim ...................... G06F 13/362 |
| | | 710/4 |
| 2019/0039467 A1* | 2/2019 | Hortop .................... B60L 53/64 |
| 2020/0036194 A1 | 1/2020 | Park et al. |
| 2022/0221524 A1* | 7/2022 | K.V. ................... G01R 31/3842 |
| 2022/0294239 A1* | 9/2022 | Liu ........................... H02J 7/40 |

FOREIGN PATENT DOCUMENTS

| | | |
|---|---|---|
| CN | 110462915 A | 11/2019 |
| CN | 111131542 A | 5/2020 |

\* cited by examiner

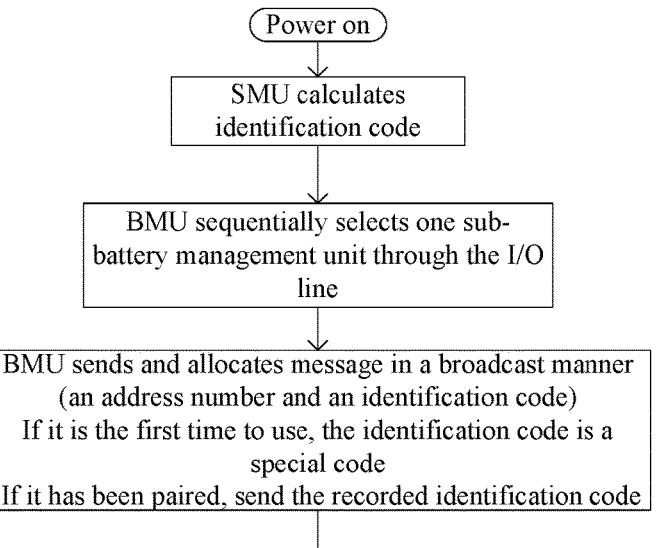

( Power on )

↓

SMU calculates
identification code

↓

BMU sequentially selects one sub-
battery management unit through the I/O
line

↓

BMU sends and allocates message in a broadcast manner
(an address number and an identification code)
If it is the first time to use, the identification code is a
special code
If it has been paired, send the recorded identification code

↓ after SMU receives the address allocation message,
If it is selected and the identification code is different from the local identification code, save the
allocated address number, send the local identification code with the configured addressto the BMU.
If it is selected and the identification code is the same as the local identification code, entering a normal
communication state.
If it is not selected and the connection timeout occurs, if the identification code is not consistent with the
local identification code, abandonthe message.
If it is not selected and the connection timeout occurs, if the identification code is consistent with the
local identification code, enter normal communication, and mark the corresponding I/O line fault

↓

After SMU pairing timeout, send a pairing request
message to BMU (identification code)

↓

After receiving the identification code, BMU looks up whether it is the same in the
recorded sequence.
If it is the same, it sends a pairing message with the sequence position number as the
address. If it is not, it adds or replaces an unused position number in sequence and
sends a pairing message with the sequence position as the address.

Fig. 1

BATTERY MANAGEMENT SYSTEM, AND METHODS FOR ADDRESS ALLOCATION AND OFFLINE RECONNECTION

This application is a national phase application of International Application No. PCT/CN2021/095377, filed on May 24, 2021, pending, which claims the benefit of Chinese Patent Application No. 202011581398.4, filed Dec. 28, 2020.

TECHNICAL FIELD

The invention relates to the technical field of battery management systems, in particular to a battery management system and an address allocation and offline reconnection method, which can be used for battery management systems of electric vehicles, for example.

BACKGROUND ART

Battery management system BMS is a system for monitoring and managing batteries. At present, battery management systems are usually divided into distributed management system and centralized management system. Wherein, the distributed management system is composed of a plurality of sub-battery management units and a main battery management unit, and each sub-battery management unit can manage and control the corresponding battery modules relatively independently, and each sub-battery management unit can communicate with the main battery management unit as a device, receive commands sent by the main battery management unit and report the collected battery information. Therefore, in the distributed management system, the main battery management unit communicates with the slave devices through the bus, which requires allocating a communication address to the sub battery management unit as the slave device.

In the prior art, there has been a method for selecting the address chip by controlling the universal IO interface of the sub-battery management unit, so that the battery management system can automatically allocate the communication address to the sub-battery management unit when it is powered on. This method can configure a new communication address for the sub-battery management unit with the default address. However, in the prior art, the address allocation process depends entirely on the address setting of the main battery management unit. If IO damage occurs, the sub-battery management unit cannot detect the enable signal, which will lead to the failure to complete the address allocation.

SUMMARY OF THE INVENTION

The purpose of the invention is to provide a battery management system and a method of an address allocation and offline reconnection method, when the sub battery management unit in the prior art cannot complete address allocation when it does not detect the address allocation enabling signal.

In order to achieve the above purpose, the technical scheme adopted by the invention is as follows:

An address allocation method, in a battery management system consisting of a main battery management unit and N sub-battery management units, where N is greater than or equal to 1, the main battery management unit is connected with the N sub-battery management units through a single bus, and the method for allocating addresses to the sub-battery management units by the main battery management unit specifically includes:

S100 After the battery management system is powered on, all sub-battery management units calculate identification codes;

S200 The main battery management unit sequentially selects one sub-battery management unit through the I/O line;

S300 The main battery management unit sends the address allocation message in a broadcast manner; wherein, the address allocation message comprises an address number and an identification code;

S400 After the first sub-battery management unit receives the address allocation message, if the first sub-battery management unit is selected, the first sub-battery management unit judges whether the identification code of the address allocation message is the same as the local identification code of the first sub-battery management unit:

if the identification code is the same as the local identification code, entering a normal communication state;

if the identification code is different from the local identification code, save the allocated address number, send the local identification code with the configured address to the main battery management unit.

The main battery management unit has an address setting enable signal, and the address distribution message is sent in a broadcast manner, and the address distribution message includes an address number and an identification code; when it is necessary to set the address to the sub-battery management unit, the enable signal is set low to be valid. When the sub-battery management unit detects that the enabling signal is valid, it saves the received address settings, and if the enabling signal is not detected, it can also complete address pairing through the identification code in the information.

Preferably, the step S400 further includes:

After the first sub-battery management unit receives the address allocation message, if the first sub-battery management unit is not selected and the first sub-battery management unit is no connection timeout, abandon the address allocation message.

Preferably, step S400 further includes: after the sub battery management unit receives the address allocation message, the connection timeout has not been selected, and also judges whether the identification code is consistent with the local identification code;

if the identification code is consistent with the local identification code, enter normal communication, and mark the corresponding I/O line fault; in this case, the connection between two or more I/O lines may wrong;

if the identification code is not consistent with the local identification code, abandon the address allocation message.

Preferably, the step S400 further includes:

if the connection timeout is not selected and the identification code is not consistent with the local identification code, the first sub-battery management unit sends a pairing request message to the main battery management unit, wherein the pairing request message includes the local identification code of the first sub-battery management unit.

Preferably, it also includes step S500:

the main battery management unit receives the local identification code in the pairing request message, and searches whether there is a corresponding record in a record sequence:

if there is a corresponding record in the recorded sequence, a pairing message with the recorded sequence position number as the address is sent;

if there is no corresponding record in the recording sequence, an unused position number is added or replaced in sequence, and a pairing message with the sequence position as the address is sent.

Preferably, the step S500 further includes:

after the first sub-battery management unit receives the pairing message, the first sub-battery management unit is selected and the identification code of the pairing message is the same as the local identification code, and enter normal communication.

A battery management system includes a main battery management unit and N sub-battery management units, wherein N is greater than or equal to 1; the main battery management unit is connected with the N sub-battery management units through CAN bus, and each sub-battery management unit adopts an address allocation method as described above, so that the main battery management unit allocates addresses to the N sub-battery management units.

The invention relates to an offline reconnection method of a battery management system, which monitors the connection state of a sub-battery management unit in real time, and if the connection is offline, an address allocation method is adopted to re-allocate the address until the offline sub-battery management unit resumes connection.

To sum up, due to the adoption of the technical scheme, the invention has the following beneficial effects:

The invention relates to a battery management system and an address allocation and offline reconnection method. The main battery management unit has an address setting enabling signal, and an address allocation message is sent in a broadcast mode, wherein the address allocation message comprises an address number and an identification code; when the address needs to be set to the sub-battery management unit, the enable signal is set low to be valid. When the sub-battery management unit detects that the enabling signal is valid, it saves the received address settings, and if the enabling signal is not detected, it can also complete address pairing through the identification code in the information.

BRIEF DESCRIPTION OF THE DRAWINGS

FIG. 1 is a flowchart of an address allocation method of the present invention.

DETAILED DESCRIPTION

The present invention will be described in detail with reference to the drawings.

In order to make the purpose, technical scheme and advantages of the invention more clear, the invention will be further described in detail with the drawings and embodiments. It should be understood that the specific embodiments described here are only used to explain the invention, and are not used to limit the invention.

Embodiment 1

Figure 2:
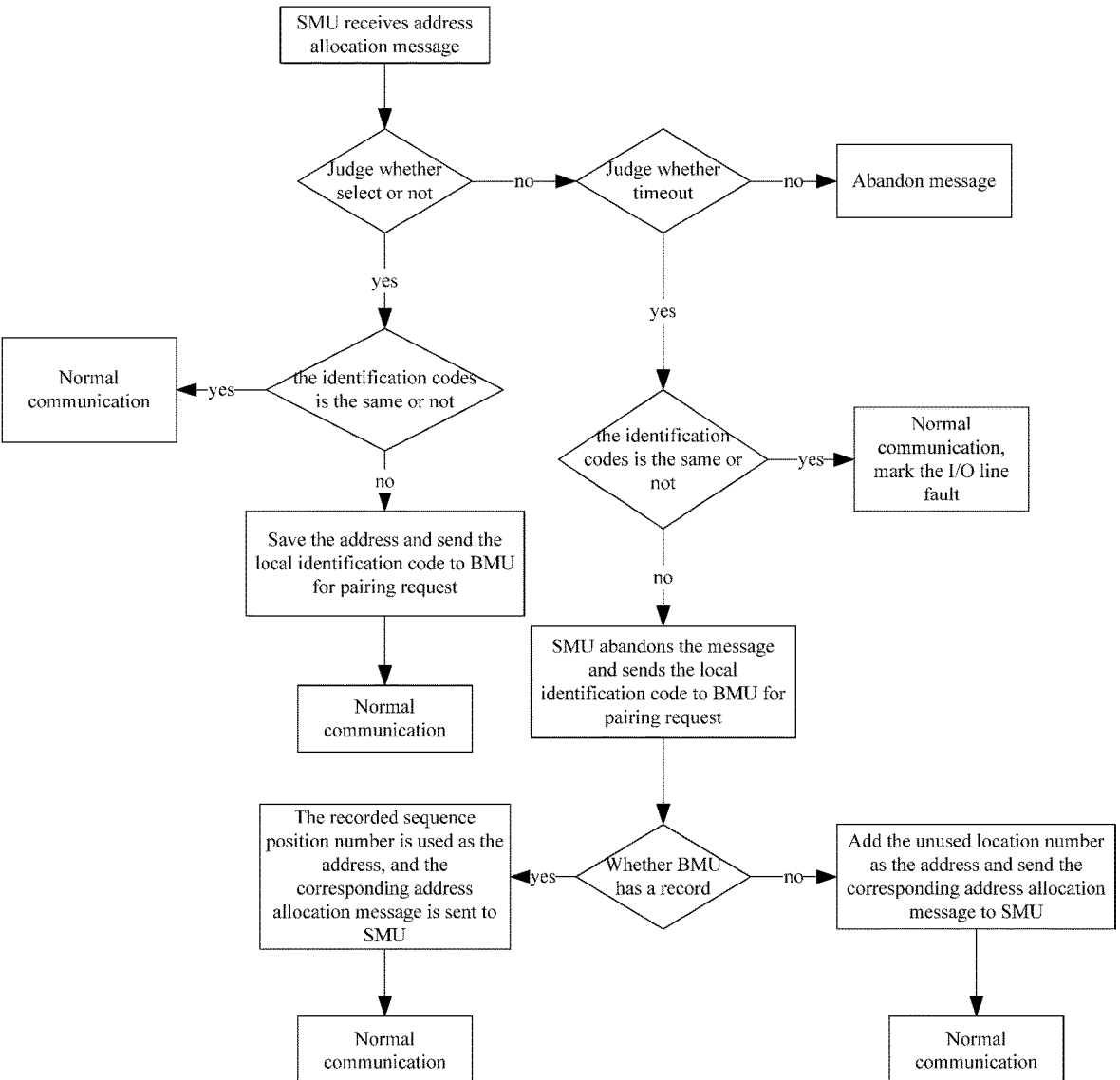
FIG. 2 is a logic diagram of the address allocation method.

An address allocation method is shown in FIG. 1, in a battery management system consisting of a main battery management unit (BMU) and N sub-battery management units (SMU), where N is greater than or equal to 1, the main battery management unit is connected with the N sub-battery management units through a single bus, and the method for allocating addresses to the sub-battery management units by the main battery management unit specifically includes:

S100 After the battery management system is powered on, all sub-battery management units calculate identification codes; wherein, the identification code is a 16-bit numerical value calculated by CRC from the unique ID of SMU;

S200 The main battery management unit sequentially selects one sub-battery management unit through the I/O line;

S300 The main battery management unit has an address setting enable signal, and the address allocation message is sent in a broadcast manner; wherein, the address allocation message comprises an address number and an identification code, and addresses are allocated to SMU by BMU and generated by BMU in sequence;

S400 As shown in FIG. 2, after the first sub-battery management unit receives the address allocation message, it first judges whether it is selected (selected: the IO port of the first sub-battery management unit detects an enable signal, which leads to a low potential), If it is selected, judge whether the identification code of the address allocation message is the same as the local identification code of the first sub-battery management unit; if the identification code is the same as the local identification code, entering a normal communication state; if the identification code is different from the local identification code, save the allocated address number, send the local identification code to the main battery management unit with the configured address and request pairing, and enter normal communication after successful pairing.

If it is not selected, then judge whether there is connection timeout (that is, whether the time spent connecting the sub-battery management unit exceeds the preset time), and if there is no connection timeout, the address allocation message is abandoned; if the connection timeout occurs, continue to judge whether the identification code is consistent with the local identification code; if the identification code is consistent with the local identification code, enter normal communication and mark the I/O line fault.

If the identification code is not consistent with the local identification code, the address allocation message is abandoned, and the first sub-battery management unit sends a pairing request message to the main battery management unit, wherein the pairing request message includes the local identification code of the first sub-battery management unit, and the main battery management unit searches whether there is a corresponding record in the recording sequence after receiving the local identification code in the pairing request message; if there is a corresponding record in the recording sequence, it sends a pairing message with the recorded serial position number as the address; If there is no corresponding record in the recording sequence, an unused position number is added or replaced in sequence, and a pairing message with the sequence position as the address is sent. After the first sub-battery management unit receives the pairing message, the first sub-battery management unit is selected and the identification code of the pairing message is the same as the local identification code, and normal communication is entered.

Aiming at the problem that the IO mode of address allocation has poor fault tolerance, and once the IO is damaged and system cannot be connected, resulting in the system cannot work in the prior art. The address allocation method of the invention uniquely identifies the sub-battery management system in the system through the IO matching identification code, and provides a fault-tolerant pairing mechanism.

Embodiment 2

Figure 3:
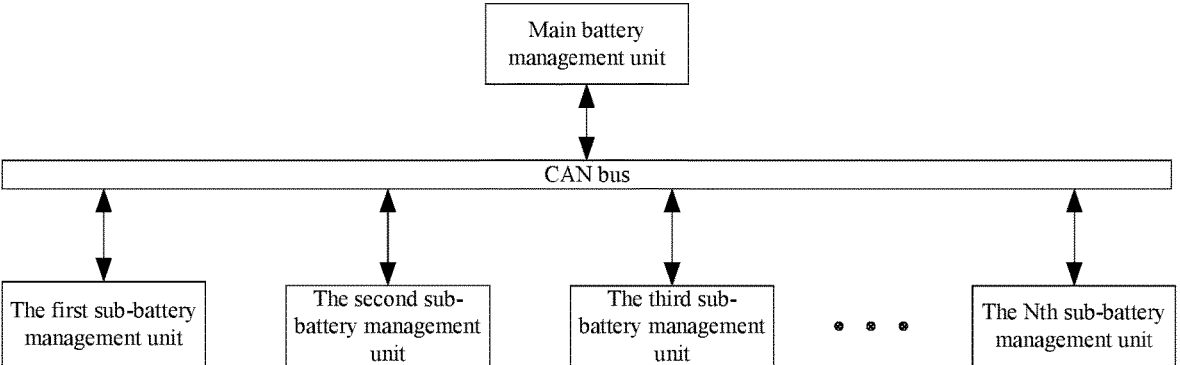
FIG. 3 is a schematic structural diagram of the battery management system provided in Embodiment 2.

This embodiment provides a battery management system as shown in FIG. 3, including a main battery management unit and N sub-battery management units. N is greater than or equal to 1, the main battery management unit is connected to N sub-battery management units through CAN bus, and each sub-battery management unit adopts an address assignment method as shown in Embodiment 1. The primary battery management unit allocates addresses to N sub-battery management units.

The use of CAN communication requires that the device address is not repeated, so it is necessary to arrange the address of the device on the CAN network. Generally, the system installation is to manually set the fixed address, but in the system of the invention, the system automatically allocates the address and corresponds to the actual physical location, so as to facilitate the troubleshooting, so that the battery pack corresponding to the sub-battery management unit can be arbitrarily combined and easy to operate.

Embodiment 3

The difference between this embodiment and Embodiment 2 is that the connection status of the sub-battery management unit of the battery management system in Embodiment 2 is monitored in real time. If the sub-battery management unit is offline, the address allocation method in Embodiment 1 is adopted to re-allocate the address until the disconnected sub-battery management unit resumes connection.

The above is only the preferred embodiment of the invention, and it is not used to limit the invention. Any modification, equivalent substitution and improvement made within the spirit and principle of the invention should be included in the protection scope of the invention.

What is claimed:

1. An address allocation method in a battery management system including a main battery management unit and N sub-battery management units, where N is greater than or equal to 1 and the main battery management unit is connected with the N sub-battery management units through a single bus, comprising:

powering the battery management system on;

calculating a local identification code in each of the N sub-battery management units;

selecting one of the N sub-battery management units through an I/O line using the main battery management unit;

broadcasting an address allocation message from the main battery management unit, wherein the address allocation message comprises an address number and an identification code;

receiving the address allocation message at the one of the N sub-battery management units, and when the one of the N sub-battery management units is selected, the one of the N sub-battery management units judges whether the identification code of the address allocation message is identical to the local identification code of the one of the N sub-battery management units:

when the identification code of the address allocation message is identical to the local identification code of the one of the N sub-battery management units, entering a normal communication state;

when the identification code of the address allocation message is different from the local identification code of the one of the N sub-battery management units, saving the address number of the address allocation message, and sending the local identification code of the one of the N sub-battery management units to the main battery management unit;

abandoning the address allocation message when (i) the one of the N sub-battery management units is not selected and there is no connection timeout in the one of the N sub-battery management units, or (ii) the identification code of the address allocation message is not consistent with the local identification code;

when the connection timeout has not occurred, the one of the N sub battery management units also judges whether the identification code of the address allocation message is consistent with or identical to the local identification code, then:

when the identification code of the address allocation message is consistent with or identical to the local identification code, entering the normal communication state, and marking a corresponding I/O line fault; and when the identification code of the address allocation message is not consistent with or identical to the local identification code, sending a first pairing request message from the one of the N sub battery management units to the main battery management unit, wherein the first pairing request message includes the local identification code;

receiving the first pairing request message and/or the local identification code in the main battery management unit, and searching whether there is a corresponding record in a record sequence;

when the corresponding record is in the record sequence, sending a second pairing message with a recorded sequence position number as an address; and when the corresponding record is not in the record sequence, adding or replacing an unused position or location number as the address, and sending a third pairing message with the unused position or location number as the address.

2. The address allocation method according to claim 1, wherein the local identification code is a 16-bit numerical value.

3. The address allocation method according to claim 2, wherein the local identification code is calculated by CRC from a unique ID of each of the N sub battery management units.

4. The battery management system according to claim 3, wherein the addresses are not repeated.

5. The address allocation method according to claim 2, where N is greater than or equal to 4.

6. A battery management system, comprising a main battery management unit and N sub-battery management units, wherein N is greater than or equal to 1; the main battery management unit is connected with the N sub-battery management units through a CAN bus, and each of the N sub-battery management units adopts the address allocation method according to claim 1, so that the main battery management unit allocates a corresponding address to each of the N sub-battery management units.

7. The battery management system according to claim 6, where N is greater than or equal to 3.

8. The battery management system according to claim 6, comprising a CAN network with the addresses therein, wherein the battery management system automatically allocates the addresses.

9. The address allocation method according to claim 1, wherein the address is for the one of the N sub battery management units.

10. The battery management system according to claim 9, where N is greater than or equal to 4.

11. The address allocation method according to claim 1, where N is greater than or equal to 3.

12. The battery management system according to claim 11, wherein the addresses correspond to actual physical locations.

13. The address allocation method according to claim 1, further comprising:

after the one of the N sub-battery management units receives the third pairing message, when the one of the N sub-battery management units is selected and the third pairing message includes an identification code that is identical to the local identification code, entering normal communication.

14. An offline reconnection method, comprising performing the address allocation method according to claim 1, and monitoring a connection state of the N sub-battery management units in real time using the battery management system, wherein the address allocation method re-allocates the address until the one of the N sub-battery management units is connected when the connection state of the one of the N sub battery management units is offline.

15. The address allocation method according to claim 1, wherein the one of the N sub battery management units has an IO port, and judges whether it is selected by detecting an enable signal at the IO port.

16. The address allocation method according to claim 1, wherein the connection timeout occurs when a time spent connecting the one of the N sub battery management units exceeds a preset time.

17. The address allocation method according to claim 1, further comprising monitoring a connection status of the N sub-battery management units in real time.

18. The address allocation method according to claim 17, wherein when the first one of the N sub-battery management units is offline, the address allocation method re-allocates the address until the first one of the N sub-battery management units is connected.

19. The address allocation method according to claim 1, wherein the unused position or location number is in a sequence.

20. The address allocation method according to claim 1, wherein the main battery management unit generates an address setting enable signal and broadcasts the address allocation message; and the main battery management unit allocates addresses to the N sub-battery management units in sequence.

\* \* \* \* \*